United States Patent
Umemoto et al.

(10) Patent No.: US 9,181,842 B2
(45) Date of Patent: Nov. 10, 2015

(54) TEMPERATURE SENSOR, SULFUR COMPONENT DETECTOR, AND EXHAUST PURIFICATION SYSTEM FOR INTERNAL COMBUSTION ENGINE

(75) Inventors: Kazuhiro Umemoto, Susono (JP); Hiromasa Nishioka, Susono (JP); Yoshihisa Tsukamoto, Susono (JP); Junichi Matsuo, Susono (JP); Takamitsu Asanuma, Mishima (JP); Takao Fukuma, Numazu (JP); Kouhei Yoshida, Gotenba (JP); Daichi Imai, Susono (JP); Yuka Nakata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1149 days.

(21) Appl. No.: 13/144,258

(22) PCT Filed: Jan. 8, 2010

(86) PCT No.: PCT/IB2010/000016
§ 371 (c)(1),
(2), (4) Date: Jul. 18, 2011

(87) PCT Pub. No.: WO2010/082104
PCT Pub. Date: Jul. 22, 2010

(65) Prior Publication Data
US 2011/0271659 A1 Nov. 10, 2011

(30) Foreign Application Priority Data

Jan. 16, 2009 (JP) .................................. 2009-007983
Sep. 17, 2009 (JP) .................................. 2009-216098

(51) Int. Cl.
*F01N 3/00* (2006.01)
*F01N 11/00* (2006.01)
(Continued)

(52) U.S. Cl.
CPC .............. *F01N 11/002* (2013.01); *F01N 3/085* (2013.01); *F01N 3/0885* (2013.01);
(Continued)

(58) Field of Classification Search
CPC ..... F01N 11/002; F01N 3/085; F01N 3/0885; F01N 2510/00; F01N 2550/02; F01N 2560/027; F01N 2560/06; F01N 2560/20; F01N 2570/04; F02D 41/1446; G01K 2205/04; Y02T 10/20; Y02T 10/47
USPC ......... 60/276, 277, 286, 295, 297; 73/114.75, 73/114.77
See application file for complete search history.

(56) References Cited

U.S. PATENT DOCUMENTS 4,325,912 A 4/1982 Sawa et al.
5,265,417 A * 11/1993 Visser et al. ..................... 60/274
(Continued)

FOREIGN PATENT DOCUMENTS

CN 1820129 A 8/2006
DE 23 51 828 A1 4/1975
(Continued)

OTHER PUBLICATIONS

International Search Report in International Application No. PCT/IB2010/000016; dated May 10, 2010.
(Continued)

*Primary Examiner* — Jason Shanske
*Assistant Examiner* — Matthew T Largi
(74) *Attorney, Agent, or Firm* — Oliff PLC

(57) ABSTRACT

A temperature sensor includes temperature detecting means and at least one of a catalyst and an adsorbent applied to the surface of the temperature detecting means. At least one of the catalyst and the adsorbent catalyzes an exothermic reaction of a reactant in gas on the temperature detecting means. A temperature that is increased by the exothermic reaction is detected by the temperature detecting means. The catalytic efficiency for the exothermic reaction of at least one of the catalyst and the adsorbent is reduced by sulfur poisoning. The temperature sensor is disposed upstream of an exhaust purification system. Accordingly, it is determined that the temperature sensor is subjected to sulfur poisoning if the temperature detected by the temperature sensor is below a prescribed temperature.

13 Claims, 13 Drawing Sheets

(51) Int. Cl.
*F01N 3/08* (2006.01)
*F02D 41/14* (2006.01)

(52) U.S. Cl.
CPC ........ *F01N 2510/00* (2013.01); *F01N 2550/02* (2013.01); *F01N 2560/027* (2013.01); *F01N 2560/06* (2013.01); *F01N 2560/20* (2013.01); *F01N 2570/04* (2013.01); *F02D 41/1446* (2013.01); *G01K 2205/04* (2013.01); *Y02T 10/20* (2013.01); *Y02T 10/47* (2013.01)

(56) References Cited

U.S. PATENT DOCUMENTS

| | | | | |
|---|---|---|---|---|
| 5,989,398 | A * | 11/1999 | Young et al. | 204/424 |
| 6,915,629 | B2 * | 7/2005 | Szymkowicz | 60/289 |
| 7,134,274 | B2 * | 11/2006 | Asanuma | 60/295 |
| 2006/0230749 | A1 | 10/2006 | Asanuma | |
| 2007/0045114 | A1 * | 3/2007 | Wang et al. | 204/431 |
| 2012/0006005 | A1 * | 1/2012 | Lee | 60/274 |

FOREIGN PATENT DOCUMENTS

| | | |
|---|---|---|
| DE | 27 58 835 A1 | 7/1979 |
| DE | 10 2006 034 234 A1 | 1/2008 |
| JP | A-10-252450 | 9/1998 |
| JP | A-2000-045753 | 2/2000 |
| JP | A-2006-161668 | 6/2006 |
| JP | A-2008-215078 | 9/2008 |
| WO | WO 99/26051 A2 | 5/1999 |
| WO | WO 99/26053 A1 | 5/1999 |
| WO | WO 2005/121516 A1 | 12/2005 |

OTHER PUBLICATIONS

Written Opinion of the International Searching Authority in International Application No. PCT/IB2010/000016, dated May 10, 2010.

International Preliminary Report on Patentability in International Application No. PCT/IB2010/000016; dated May 10, 2010.

* cited by examiner

TEMPERATURE SENSOR, SULFUR COMPONENT DETECTOR, AND EXHAUST PURIFICATION SYSTEM FOR INTERNAL COMBUSTION ENGINE

BACKGROUND OF THE INVENTION

1. Field of the Invention

The present invention relates to a temperature sensor, a sulfur component detector, and an exhaust purification system for an internal combustion engine.

2. Description of the Related Art

In an exhaust purification system for an internal combustion engine that includes a NOx storage-reduction catalyst, a sulfur component in exhaust gas is stored in the NOx storage-reduction catalyst, and thereby decreases NOx purification efficiency of the NOx storage-reduction catalyst.

When the NOx purification efficiency of the NOx storage-reduction catalyst is decreased by sulfur poisoning, the NOx storage-reduction catalyst is heated in a rich air-fuel ratio atmosphere to regenerate the catalyst. However, this results in thermal aging of the NOx storage-reduction catalyst, which is caused by the catalytic regeneration, and reduced fuel efficiency.

Considering the above, as shown in FIG. 4, a sulfur trap device 20 is disposed upstream of the NOx storage-reduction catalyst 30 and traps sulfur in the exhaust gas at a location upstream of the NOx storage-reduction catalyst 30 in order to prevent sulfur poisoning of the NOx storage-reduction catalyst 30. Accordingly, the thermal aging of the NOx storage-reduction catalyst 30, which is caused by the catalyst regeneration, and deterioration in fuel efficiency are prevented. The arrow A in FIG. 4 indicates a flow direction of the exhaust gas.

However, when the amount of sulfur accumulated in a sulfur trap catalyst or a sulfur adsorbent exceeds a threshold capacity in the sulfur trap device 20, the sulfur component passes through the sulfur trap device 20. The NOx storage-reduction catalyst 30 downstream of the sulfur trap device 20, is then subjected to sulfur poisoning. Accordingly, the sulfur trap catalyst or the sulfur adsorbent needs to be replaced. More specifically, it is a precondition of the configuration in FIG. 4 that the NOx storage-reduction catalyst 30 does not include catalytic regeneration means. Therefore, before the NOx storage-reduction catalyst 30 becomes subjected to sulfur poisoning, the decreased efficiency of the sulfur trap device 20 has to be estimated, and accordingly, the sulfur trap catalyst or the sulfur adsorbent has, to be replaced. In the related art, an amount of the sulfur component that passes through the sulfur trap device 20 is estimated from the decreased efficiency of the NOx storage-reduction catalyst 30, and the sulfur trap catalyst or the sulfur adsorbent is replaced accordingly. In the related art, however, a minute amount of the sulfur component that passes through the sulfur trap device 20 cannot be detected before the efficiency of the NOx storage-reduction catalyst 30 is decreased.

Conventionally, the amount of the sulfur component that flows into the NOx storage-reduction catalyst 30 is estimated based on the reduced performance of the NOx storage-reduction catalyst 30, and means for detecting sulfur poisoning of the NOx storage-reduction catalyst 30 itself is not provided. In this case, sulfur poisoning of the NOx storage-reduction catalyst 30 usually starts on the upstream side of the catalyst, as shown in the graph C of FIG. 5. Thus, before the performance of the entire NOx storage-reduction catalyst 30 is reduced, it is possible to predict deterioration of the NOx storage-reduction catalyst 30 from changes in a physical property (e.g. temperature) of the front-end surface of the NOx storage-reduction catalyst 30. Meanwhile, as shown in graph D of FIG. 5, depending on an operating condition of the internal combustion engine in which a temperature of the exhaust gas is low, in which an amount of the exhaust gas is large, or the like, the entire NOx storage-reduction catalyst 30 may become subjected to sulfur poisoning in a longitudinal direction. Graph B indicates a detectable level of sulfur poisoning. As described above, the portion of the NOx storage-reduction catalyst 30 that is subjected to sulfur poisoning varies in accordance with the operating condition. Therefore, detection of sulfur poisoning by means such as measuring the temperature of a portion of the NOx storage-reduction catalyst 30 is generally invalid because of its inaccuracy.

Japanese Patent Application Publication No. 2000-45753 (JP-A-2000-45753) describes an exhaust purification system for an internal combustion engine that includes: a NOx adsorbent that adsorbs the sulfur component in the exhaust gas; and a SOx sensor that is provided upstream of the NOx adsorbent to determine deterioration in a NOx adsorbing capacity of the NOx adsorbent, which is caused by sulfur poisoning of the NOx adsorbent.

In the exhaust purification system that described in JP-A-2000-45753, the SOx sensor detects the concentration of SOx in the exhaust gas in real time based on the potential difference between electrodes that each includes a SOx reduction catalyst such as platinum. Then, based on a detected value, the SOx sensor calculates an accumulated amount of SOx that is estimated to be adsorbed by the NOx adsorbent.

It is described in JP-A-2000-45753 that the sulfur component of several hundred ppm is contained in fuel. However, the amount of the sulfur component in fuel has been reduced with improved fuel properties, and today, less than ten ppm of the sulfur component is contained in fuel, and thus is extremely lean. Accordingly, it has become difficult to detect the sulfur component in the passing exhaust gas in real time based on the potential difference between the electrodes that each includes the SOx reduction catalyst such as platinum. Therefore, the SOx sensor described in JP-A-2000-45753 is no longer practical.

SUMMARY OF THE INVENTION

The present invention provides a temperature sensor that catalyzes an exothermic reaction of a reactant in gas to detect a temperature, and means for accurately detecting sulfur components in exhaust gas, even at low concentrations by utilizing the temperature sensor. The present invention also provides an exhaust purification system for an internal combustion engine that utilizes the means for detecting the sulfur component.

The temperature sensor according to a first aspect of present invention includes temperature detecting means, and at least one of a catalyst and an adsorbent that is applied to a surface of the temperature detecting means. At least one of the catalyst and the adsorbent catalyzes the exothermic reaction of the reactant in the gas. At least one of the catalyst and the adsorbent catalyzes the exothermic reaction of the reactant in the gas on the temperature detecting means. Then, the temperature detecting means detects a temperature that is increased by the exothermic reaction.

In the temperature sensor according to the above aspect, a temperature-detecting portion of the temperature detecting means is coated with at least one of the catalyst and the adsorbent, and the exothermic reaction of the reactant in the gas is catalyzed on the temperature detecting means. The temperature detecting means detects the temperature that is increased by the exothermic reaction. Thus, the temperature sensor according to the above aspect is unlike a conventional temperature sensor that simply detects the temperature of an object. The present invention has been made on the basis of a novel idea that the exothermic reaction is catalyzed on the temperature detecting means so as to detect the temperature that is increased by the exothermic reaction.

In the temperature sensor according to the first aspect, at least one of the catalyst and the adsorbent may be a catalyst or an adsorbent whose catalytic efficiency for the exothermic reaction of the reactant in the gas is degraded by sulfur poisoning.

When the catalyst or the adsorbent of the temperature sensor is poisoned by sulfur, thereby decreasing the catalytic activity of the catalyst or the adsorbent, the exothermic reaction of the reactant in the gas is no longer initiated on the temperature detection means. Considering the above, the temperature sensor according to the above aspect is provided with a SOx sensor that detects the sulfur component in the gas with high accuracy, even when only a minute amount of the sulfur component is contained in the gas. A conventional SOx sensor measures, in real time, a potential difference between electrodes that each includes a SOx reduction catalyst, such as platinum, and cannot detect minute amounts of SOx below 10 ppm. Because the catalyst or the adsorbent applied to the surface of the temperature detecting means stores SOx, it is possible in the present invention to detect concentrations of SOx below 10 ppm with high accuracy as an accumulated amount of SOx that passes through.

In the temperature sensor according to the first aspect, at least one of the catalyst and the adsorbent that is applied to the surface of the temperature detecting means in the temperature sensor may be a carrier in which alumina or zirconia is supported by alkali metal or alkaline-earth metal and which also carries palladium.

In the temperature sensor according to the above aspect, a catalytic species whose activity is significantly decreased by sulfur poisoning is adopted as a catalyst. A basic carrier that is also susceptible to sulfur poisoning is adopted as a carrier. Materials with an oxygen storage capacity (OSC), such as ceria and praseodymium, should not used for the temperature sensor. Accordingly, the temperature sensor only detects heat generation during NOx reduction with significantly improved sensitivity.

In the temperature sensor according to the first aspect, the gas is exhaust gas from an internal combustion engine. At least one of the catalyst and the adsorbent that is applied to the surface of the temperature detecting means stores oxygen or nitrogen oxide in the exhaust gas when the internal combustion engine operates at a lean air-fuel ratio, and releases oxygen or nitrogen oxide into the exhaust gas when the internal combustion engine operates at a rich air-fuel ratio. At least one of the catalyst and the adsorbent utilizes released oxygen or nitrogen oxide to initiate the exothermic reaction of the reactant in the exhaust gas on the temperature detecting means. Then, the temperature detecting means detects the temperature that is increased by the exothermic reaction. An oxygen or nitrogen oxide storage capacity and a catalytic efficiency for the exothermic reaction of at least one of the catalyst and the adsorbent is reduced by sulfur poisoning.

The temperature sensor according to the above aspect is provided with the SOx sensor that detects the sulfur component with high accuracy even if only a minute amount of the sulfur component is present in the exhaust gas that is produced after combustion of fuel that contains sulfur. A material that has the OSC, such as ceria and praseodymium, is utilized as the catalyst or the adsorbent that is applied to the surface of the temperature detecting means. The catalyst or the adsorbent utilizes stored oxygen to catalyze the exothermic reaction of the reactant in the exhaust gas. Alternatively, a material such as alkali metal, alkali-earth metal, or rare earth that stores oxygen as NOx may be utilized as the catalyst or the adsorbent. The catalyst or the adsorbent utilizes stored NOx to catalyze the exothermic reaction of the reactant in the exhaust gas. Then, because the OSC and the NOx storage capacity are reduced by sulfur poisoning, the SOx sensor is provided that accurately detect the concentration of the sulfur component even if only a minute amount of the sulfur component is present in the exhaust gas.

The temperature sensor according to the first aspect may undergo a pretreatment. In the pretreatment, the temperature sensor is first subjected to sulfur poisoning, and then purged of the sulfur component that is adsorbed by at least one of the catalyst and the adsorbent applied to the surface of the temperature detection means.

The sensitivity of temperature sensor according to the above aspect decreases as the amount of the sulfur component that passes through increases. Once the degree of sulfur poisoning of the temperature sensor reaches a threshold degree, the purging of the sulfur component that is adsorbed by at least one of the catalyst and the adsorbent applied to the surface of the temperature detecting means is performed. However, there is a region in the temperature sensor that cannot recover from sulfur poisoning even with the purge treatment and is permanently poisoned by sulfur. Thus, when the temperature sensor is installed in a real machine, the temperature sensor may undergo the pretreatment before installment. In the pretreatment, the temperature sensor is first subjected to sulfur poisoning, and then the purge treatment of the sulfur component adsorbed by at least one of the catalyst and the adsorbent is performed.

The temperature sensor according to the first aspect may further include a pump cell that has an oxygen-pumping function, and a heater.

When the purge treatment is performed in the temperature sensor that is being utilized in the real machine, it is required to obtain the exhaust gas at the rich air-fuel ratio and at a high temperature by injecting the fuel into the exhaust gas and combusting oxygen in the exhaust gas. However, a large amount of the fuel is required to make a total amount of the exhaust gas at the rich air-fuel ratio and the high temperature. Considering the above, the temperature sensor according to the above aspect may further include the pump cell that has the oxygen-pumping function, and the heater. In such configuration, when the pump cell removes oxygen from the exhaust gas flowing near the temperature sensor, the air-fuel ratio of the atmosphere near the temperature sensor becomes rich. Thus, the purge treatment in the temperature sensor may easily be performed by heating the temperature sensor with the heater. Accordingly, there is no need to inject the fuel into the exhaust gas or to make the total amount of the exhaust gas at the rich air-fuel ratio and the high temperature. Therefore, the purge treatment can be performed very economically.

The temperature sensor according to the first aspect, the sensitivity of the temperature sensor may be corrected to sensitivity that is suited for the rich air-fuel ratio when the temperature sensor is disposed downstream of a NOx storage-reduction catalyst to measure a sulfur release amount of the NOx storage-reduction catalyst during a catalytic regeneration operation.

The temperature sensor according to the above aspect is disposed downstream of the NOx storage-reduction catalyst, and thus can measure the sulfur release amount from the NOx storage-reduction catalyst during the catalytic regeneration operation. In this case, when the NOx storage-reduction catalyst is in the rich air-fuel ratio atmosphere during the catalyst regeneration operation, the catalyst or the adsorbent of the temperature sensor is also in a regeneration atmosphere. Accordingly, a trapped amount of sulfur in the temperature sensor decreases in comparison with the trapped amount of sulfur during a normal operation. Thus, when the sulfur release amount of the NOx storage-reduction catalyst during the catalytic regeneration operation is measured, the sensitivity of the temperature sensor in the rich air-fuel ratio atmosphere is obtained in advance. Then, by creating a sensitivity map and the like that utilize the obtained sensitivity of the temperature sensor, it is possible to correct the sensitivity of the temperature sensor.

In a sulfur component detector according to a second aspect of the present invention, the temperature sensor according to the first aspect is disposed in a flow passage of the gas, detects a temperature $T_1$ that is increased by the exothermic reaction, compares the temperature $T_1$ with a temperature $T_0$ that is increased by the exothermic reaction when the sulfur component is not present in the gas, and determines that the sulfur component is present in the gas in the flow passage if the temperature $T_1$ is below the temperature $T_0$.

The sulfur component detector according to the above aspect utilizes the temperature sensor according to the first aspect to accurately detect whether the sulfur component is present in the gas flowing in the flow passage. More specifically, if the catalyst or the adsorbent of the temperature sensor according to the first aspect is subjected to sulfur poisoning and thereby decreases its activity, the exothermic reaction of the reactant in the gas can no longer be initiated on the temperature detecting means. The detected temperature $T_1$ becomes lower than the temperature $T_0$ that is obtained before sulfur poisoning. Accordingly, by utilizing a difference between the temperatures, the sulfur component detector detects that the sulfur component is present in the gas flowing in the flow passage.

In the sulfur component detector according to the second aspect, the temperature sensor may be disposed upstream in an exhaust pipe of an internal combustion engine; the sulfur component adsorbed by at least one of the catalyst and the adsorbent that is applied to the temperature detecting means may be treated with a purge treatment if a temperature difference $dT_1$ between the temperature $T_0$ and, the temperature $T_1$ becomes equal to or larger than a specified value due to a decrease in the temperature $T_1$ that is indicated by the sulfur component detector; and it may be determined that fuel in use contains a high concentration of the sulfur component if a fuel consumption amount after the adsorbed sulfur component has been purged and before the next purge treatment falls below a specified fuel consumption amount.

In the sulfur component detector according to the second aspect, the temperature sensor may be disposed upstream in an exhaust pipe of an internal combustion engine; the sulfur component adsorbed by at least one of the catalyst and the adsorbent that is applied to the temperature detecting means may be treated with a purge treatment if a temperature difference $dT_1$ between the temperature $T_0$ and the temperature $T_1$ becomes equal to or larger than a specified value due to a decrease in the temperature $T_1$ that is indicated by the sulfur component detector; and it may be determined that fuel in use contains a high concentration of the sulfur component if a time interval after the adsorbed sulfur component has been purged and before the next purge treatment falls below a specified time interval due to a increased degree of sulfur poisoning.

The sulfur component detector according to the above aspect is disposed upstream in the exhaust pipe of the internal combustion engine, and is utilized to determine whether the fuel used contains a high concentration of the sulfur component. It is advantageous to use the determination to further determine that deterioration in the exhaust purification system for an internal combustion engine is not attributed to the exhaust purification system itself but to deterioration in a fuel property. More specifically, if the fuel contains a high concentration of the sulfur component, the sulfur component in the exhaust gas is also high. Accordingly, a cycle of the purge treatment of the catalyst or the adsorbent that is applied to the surface of the temperature detecting means and is subjected to sulfur poisoning is shortened. Based on the above, the sulfur component detector is provided to determine whether the fuel used contains a high concentration of the sulfur component.

The sulfur component detector according to the second aspect may further include a member that has a specified heat capacity. The temperature sensor may be disposed in an exhaust passage of the internal combustion engine, and the member that has the specified heat capacity may be disposed upstream of the temperature sensor, so that time at which an exhaust temperature increase by combustion in the internal combustion engine is detected by the temperature sensor is delayed. Accordingly, the sulfur component detector may separately detect the exhaust temperature increase by combustion in the internal combustion engine from a temperature increase by the exothermic reaction in the temperature sensor.

If the member with the heat capacity such as a sulfur trap device is not provided upstream of the sulfur component detector according to the above aspect, the exhaust temperature increase at a position immediately downstream of the internal combustion engine overlaps the temperature increase by the exothermic reaction in the temperature sensor. Thus, the sulfur component detector according to the above aspect separates the temperature increases from one another, so that the temperature sensor only detects the temperature increase by the exothermic reaction. Therefore, the detection accuracy of the sulfur component detector according to the second aspect is improved.

In a sulfur component detector according to a third aspect of the present invention, the temperature sensor according to claim 6 is disposed downstream of a NOx storage-reduction catalyst;
oxygen is released near the temperature sensor by the oxygen pumping function; and
a sulfur release amount of the NOx storage-reduction catalyst during a catalytic regeneration operation is measured after the atmosphere near the temperature sensor becomes a lean air-fuel ratio atmosphere.

The sulfur component detector according to the above aspect utilizes the temperature sensor according to the first aspect. The oxygen-pumping function of the pump cell in the temperature sensor according to the first aspect is actuated to deliver oxygen toward the temperature sensor. Then, oxygen is released near the temperature sensor to maintain only the proximity of the temperature sensor in the lean air-fuel ratio atmosphere. Accordingly, it is possible to measure the amount of sulfur released by the NOx storage-reduction catalyst during the catalytic regeneration operation without reducing the sensitivity of the temperature sensor.

An exhaust purification system for an internal combustion engine according to a fourth aspect of the present invention includes: a sulfur trap device disposed upstream of the exhaust purification system to store a sulfur component present in exhaust gas; and the sulfur component detector according to claim 8 is provided downstream of the sulfur trap device and upstream of the exhaust purification system. If performance of the sulfur trap device to store the sulfur component in the exhaust gas is decreased, and thus, the exhaust gas that contains the sulfur component flows into the exhaust purification system, it is determined by the sulfur component detector that the sulfur component is present in the exhaust gas flowing into the exhaust purification system.

The exhaust purification system for an internal combustion engine according to the above aspect includes the sulfur trap device upstream of the exhaust purification system. When the sulfur trap device is subjected to sulfur poisoning and thereby decreases its performance to store the sulfur component in the exhaust gas, the exhaust gas that contains the sulfur component flows into the exhaust purification system downstream of the sulfur trap device. In this case, the minute amount of the sulfur component that passes through the sulfur trap device is detected by the sulfur component detector according to the second aspect.

An exhaust purification system for an internal combustion engine according to a fifth aspect of the present invention includes: a sulfur trap device disposed upstream of the exhaust purification system and stores a sulfur component present in exhaust gas; a sulfur component detector wherein: the temperature sensor according to claim 4 is disposed downstream of the sulfur trap device and upstream of the exhaust purification system; a temperature $T_1$ that is increased by an exothermic reaction of a reactant in the temperature sensor is detected; the detected temperature $T_1$ is then compared with a temperature $T_0$ that is increased by the exothermic reaction if the sulfur component is not present in the exhaust gas; and wherein it is determined that the sulfur component is present in the exhaust gas if the temperature $T_1$ is below the temperature $T_0$; and oxygen consumption means for providing upstream of the temperature sensor. When the internal combustion engine operates at the rich air-fuel ratio, the oxygen consumption means consumes oxygen remaining in the exhaust gas.

The exhaust purification system for an internal combustion engine according to the above aspect momentarily provides the rich air-fuel ratio atmosphere to the NOx storage-reduction catalyst that stores NOx when NOx purification is performed by the NOx storage-reduction catalyst. In other words, a rich spike is performed to reduce NOx that is stored in the NOx storage-reduction catalyst. At this time, the catalyst or the adsorbent applied to the surface of the temperature detecting means releases oxygen that is stored at the lean air-fuel ratio. Consequently, the exothermic reaction of the reactant or a reducing agent that is contained in the rich spike is initiated on the temperature detecting means. Then, by comparing the temperature $T_0$ that is indicated by the sulfur component detector with the temperature $T_1$ that is indicated by the sulfur component detector after sulfur poisoning, it may be determined that the sulfur component is contained in the exhaust gas. In this case, because the exhaust gas in a rich air-fuel ratio operating condition contains a minute amount of oxygen, the exothermic reaction of the reducing agent is initiated with oxygen in the exhaust gas. Accordingly, the accuracy in detecting the presence of the sulfur component decreases. In order to prevent the decrease in the accuracy to detect the sulfur component, the oxygen consumption means is provided upstream of the sulfur component detector to consume oxygen that is present in the exhaust gas in the rich air-fuel ratio operating condition. Accordingly, the exothermic reaction on the temperature sensor only utilizes oxygen that is released by the catalyst or the adsorbent applied to the surface of the temperature detecting means. Therefore, it is possible detect whether the sulfur component is present in the exhaust gas flowing into the exhaust purification system with improved accuracy.

An exhaust purification system for an internal combustion engine according to a sixth aspect of the present invention includes: a sulfur trap device provided upstream of the exhaust purification system to store a sulfur component present in exhaust gas; and a sulfur component detector, wherein: the temperature sensor according to claim 4 is disposed downstream of the sulfur trap device and upstream of the exhaust purification system; a temperature $T_1$ that is increased by an exothermic reaction of a reactant in the temperature sensor is detected; and the detected temperature $T_1$ is then compared with a temperature $T_0$ that is increased by the exothermic reaction if the sulfur component is not present in the exhaust gas; and wherein it is determined that the sulfur component is present in the exhaust gas if the temperature $T_1$ is below the temperature $T_0$, wherein: if the internal combustion engine operates at a rich air-fuel ratio, a remaining amount of oxygen in the exhaust gas is estimated from an operating condition of the internal combustion engine; a temperature increase $dT_{ox}$ that depends on the remaining amount of oxygen and is indicated by the sulfur component detector is estimated. When a temperature $T_1'$ that is obtained by subtracting the temperature increase $dT_{ox}$ from the temperature $T_1$ that is indicated by the sulfur component detector is below the temperature $T_0$, it is determined that the sulfur component is present in the exhaust gas flowing into the exhaust purification system.

Like the exhaust purification system according to the fifth aspect, the exhaust purification system for an internal combustion engine according to the above aspect utilizes the temperature sensor according to the first aspect to determine whether the sulfur component is present in the exhaust gas. In this case, in order to prevent a decrease in the accuracy of detecting the sulfur component that is caused by the exothermic reaction of the reducing agent that is initiated with oxygen contained in the exhaust gas in the rich air-fuel ratio operating condition, the amount of heat generation that depends on oxygen contained in the exhaust gas in the rich air-fuel ratio operating condition is corrected by calculation. More specifically, the sulfur component detector includes an operation map from which the remaining amount of oxygen in the exhaust gas is obtained in accordance with the operating condition of the engine. The temperature increase $dT_{ox}$ that is determined by the sulfur component detector based on the remaining amount of oxygen is obtained from the operation map. Then, the temperature $T_1$ detected by the sulfur component detector is corrected. As described above, the temperature $T_1'$, which only depends on the heat generation by oxygen released by the catalyst or the adsorbent that is applied to the surface of the temperature detecting means, is calculated. Because the temperature $T_1'$ is below the temperature $T_0$, it may be determined with greater accuracy that the sulfur component is present in the exhaust gas flowing into the exhaust purification system.

An exhaust purification system for an internal combustion engine according to a seventh aspect of the present invention includes: a sulfur trap device provided upstream of the exhaust purification system to store a sulfur component present in exhaust gas; and a sulfur component detector, wherein: the temperature sensor according to claim 4 is disposed downstream of the sulfur trap device and upstream of the exhaust purification system; a temperature $T_1$ that is increased by an exothermic reaction of a reactant in the temperature sensor is detected; and the detected temperature $T_1$ is then compared with a temperature $T_0$ that is increased by the exothermic reaction if the sulfur component is not present in the exhaust gas; and wherein it is determined that the sulfur component is present in the exhaust gas if the temperature $T_1$ is below the temperature $T_0$. The remaining amount of oxygen in the exhaust gas is estimated from an operating condition of the internal combustion engine if the internal combustion engine operates at a rich air-fuel ratio. A heating value $Q_1$ that depends on the remaining amount of oxygen is estimated; a total heating value $Q_2$ is calculated from a detected value by the sulfur component detector; the heating value $Q_1$ is subtracted from the heating value $Q_2$; and it is determined that the sulfur component is present in the exhaust gas flowing into the exhaust purification system if the resulting difference between $Q_1$ and $Q_2$ is equal to or below a prescribed value.

The present invention provides a temperature sensor that initiates an exothermic reaction of a reactant in gas to detect a temperature, and means for accurately detecting a lean sulfur component in exhaust gas by utilizing the temperature sensor. The present invention also provides an exhaust purification system for an internal combustion engine that utilizes the means for detecting the sulfur component.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
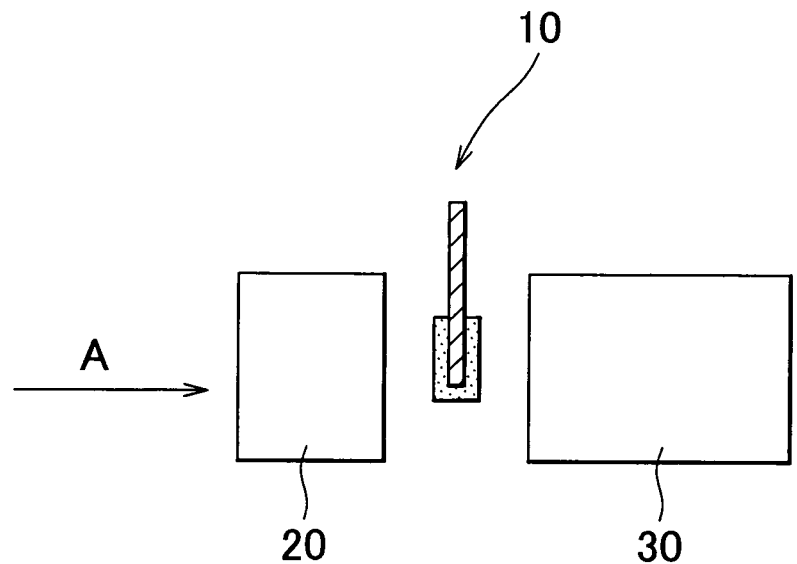
FIG. 1 is a schematic diagram in which a temperature sensor according to embodiments of the present invention is applied as a sulfur component detector to an exhaust purification system for an internal combustion engine.

Embodiments of the present invention will hereinafter be described with reference to the accompanying drawings. In the accompanying drawings, the same or like members are denoted with the same reference numerals.

Figure 2:
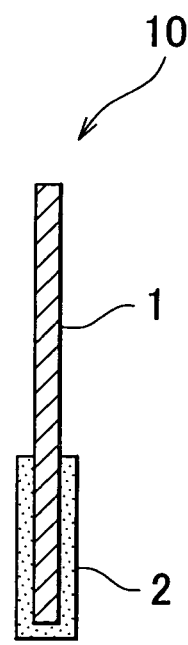
FIG. 2 is a schematic diagram of the temperature sensor according to the embodiments of the present invention.

FIG. 2 shows a temperature sensor 10 according to the embodiments of the present invention. The temperature sensor 10 includes temperature detecting means 1 and a catalyst (or an adsorbent) 2 that is applied to a surface of the temperature detecting means 1. The catalyst (or the adsorbent) 2 catalyzes an exothermic reaction of a reactant in gas, such as hydrocarbon and carbon monoxide. The catalyst (or the adsorbent) 2 catalyzes the exothermic reaction of the reactant in the gas on the temperature detecting means 1. A temperature that is increased by the exothermic reaction is detected by the temperature detecting means 1. The catalyst may be a carrier such as alumina, zirconia, and ceria, or a carrier such as alumina, zirconia, ceria that is supported by alkaline-earth metal, where the carrier carries an active species with an oxidative activity such as platinum, palladium, rhodium, gold, and silver. The catalyst is preferably a basic carrier that is susceptible to sulfur poisoning and is supported by palladium or silver whose activity is significantly decreased by sulfur poisoning.

When the gas is exhaust gas from an internal combustion engine, a catalyst (or the adsorbent) that adsorbs oxygen or NOx under a lean air-fuel ratio atmosphere and releases oxygen or NOx under a rich air-fuel ratio atmosphere] is adopted as the catalyst (or the adsorbent) 2. The exothermic reaction of the reactant is initiated with oxygen or NOx that is released by the catalyst (or the adsorbent) 2. Then, the increase in temperature by the exothermic reaction is detected by the temperature detecting means 1. The catalyst (or the adsorbent) 2 in this case may be a carrier that has an oxygen storage capacity (OSC) such as ceria and praseodymium, or a material carrying alkali metal, alkali-earth metal, or rare earth that that adsorbs oxygen or NOx under a lean air-fuel ratio atmosphere] and releases oxygen or NOx under a rich air-fuel ratio atmosphere.

Figure 3:
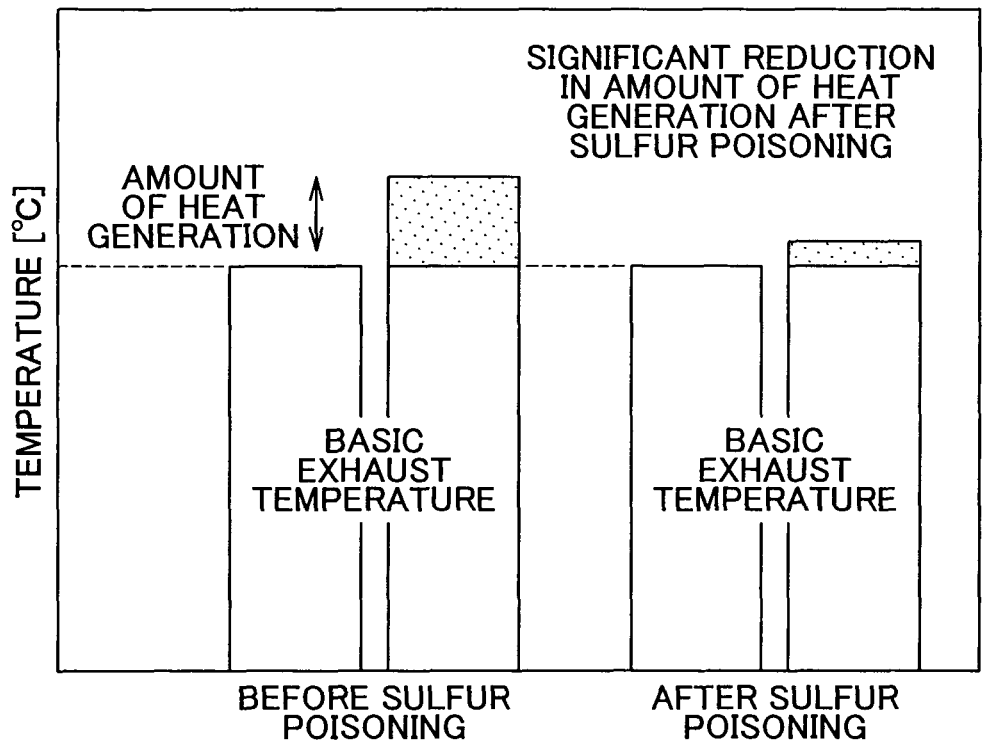
FIG. 3 is a chart that explains the detection of the sulfur component when the temperature sensor shown in FIG. 2 is employed as the sulfur component detector.

FIG. 3 is a chart that describes detection of the concentration of a sulfur component in the gas with the temperature sensor 10 in FIG. 2. Specifically, before the catalyst (or the adsorbent) 2 applied to the surface of the temperature detecting means 1 in the temperature sensor 10, is subjected to sulfur poisoning, the exothermic reaction of the reactant in the gas is initiated on the temperature detecting means 1, and the temperature that is detected by the temperature detecting means 1 increases significantly. However, after the catalyst (or the adsorbent) 2 is subjected to sulfur poisoning, the exothermic reaction of the reactant in the gas on the temperature detecting means 1 is deteriorated and eventually terminated. Thus, a temperature increase by the exothermic reaction is significantly reduced. It is possible to detect an increase of the sulfur component in the gas from a difference between detected temperatures. In this embodiment, the accumulated amount of sulfur that passes through is detected by trapping the sulfur component of the flowing gas in the catalyst (or the adsorbent) 2. Thus, it is possible to accurately detect the lean sulfur component by accumulating the extremely lean sulfur component of less than 10 ppm that is contained in the gas.

FIG. 1 shows a sulfur component detector that detects the sulfur component in the exhaust gas based on the above detection principle by applying the temperature sensor 10 in FIG. 2 to an exhaust purification system for an internal combustion engine. More specifically, the temperature sensor 10 is disposed downstream of a sulfur trap catalyst 20 and upstream of a NOx storage-reduction catalyst 30. The temperature sensor 10 detects minute amounts of the sulfur component passing through the sulfur trap catalyst 20 with high accuracy, and also detects minute amounts of the sulfur component passing through before the performance of the NOx storage-reduction catalyst 30 decreases.

Figure 4:
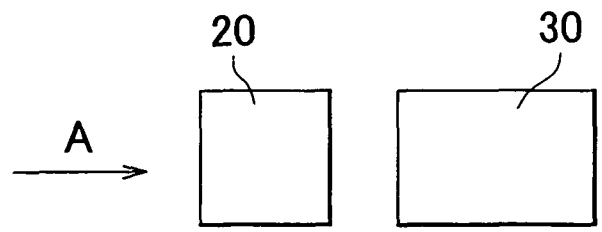
FIG. 4 is a view that describes an exhaust purification system for an internal combustion engine according to a related art.
Figure 5:
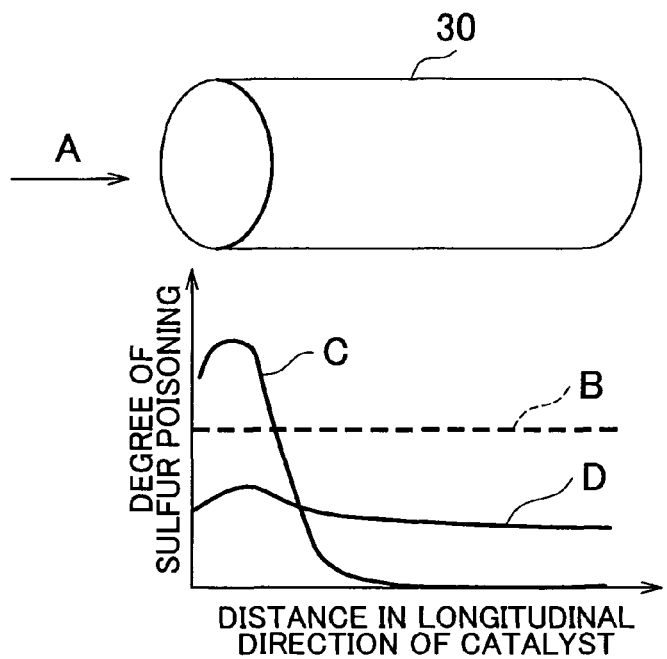
FIG. 5 is a view that describes the exhaust purification system for the internal combustion engine according to the related art.

FIGS. 4 and 5 shows problems of a conventional exhaust purification system for an internal combustion engine in the related art, and the problems have been described in the Description of the Related Art.

Figure 6:
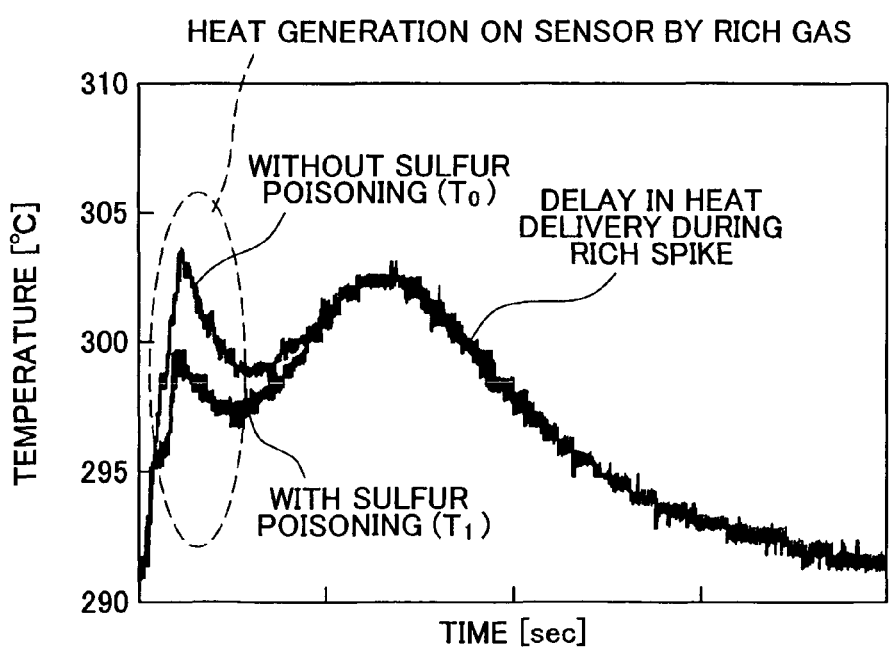
FIG. 6 is a graph that depicts changes in temperatures detected by the temperature sensor as the sulfur component detector according to the embodiments of the present invention.

FIG. 6 is a graph that contrasts changes in temperatures that are detected by the temperature sensor 10 before and after the catalyst (or the adsorbent) 2 applied to the surface of the temperature detecting means 1 in the temperature sensor 10, is subjected to sulfur poisoning. More specifically, the first peaks in the temperatures detected by the temperature sensor 10 before and after sulfur poisoning vary significantly. A difference between these temperatures is the same as the difference between the temperatures that has been described in the principle chart of FIG. 3, and is detected as a temperature difference that is shown in FIG. 6. Thus, it is possible to determine whether the sulfur component is present in the exhaust gas. More specifically, the temperature sensor 10 is disposed in a flow passage of the gas, detects a temperature $T_1$ that is increased by the exothermic reaction of the reactant by the temperature sensor 10, and compares the temperature $T_1$ with a temperature $T_0$ that is increased by the exothermic reaction when the sulfur component is not contained in the gas. When the temperature $T_1$ is lower than the temperature $T_0$, it is determined that the sulfur component is present in the gas in the flow passage. A peak that appears subsequently in FIG. 6 indicates that the temperature of the exhaust gas is increased by combustion of rich air-fuel mixture in the internal combustion engine. Because the sulfur trap device 20 that is located upstream of the temperature sensor 10 has a high heat capacity, the sulfur trap device 20 increases the temperature of the exhaust gas that passes through the temperature sensor 10 after the exhaust gas increases the temperature of the sulfur trap device 20. For this reason, the subsequent peak in the temperature appears late.

Figure 7:
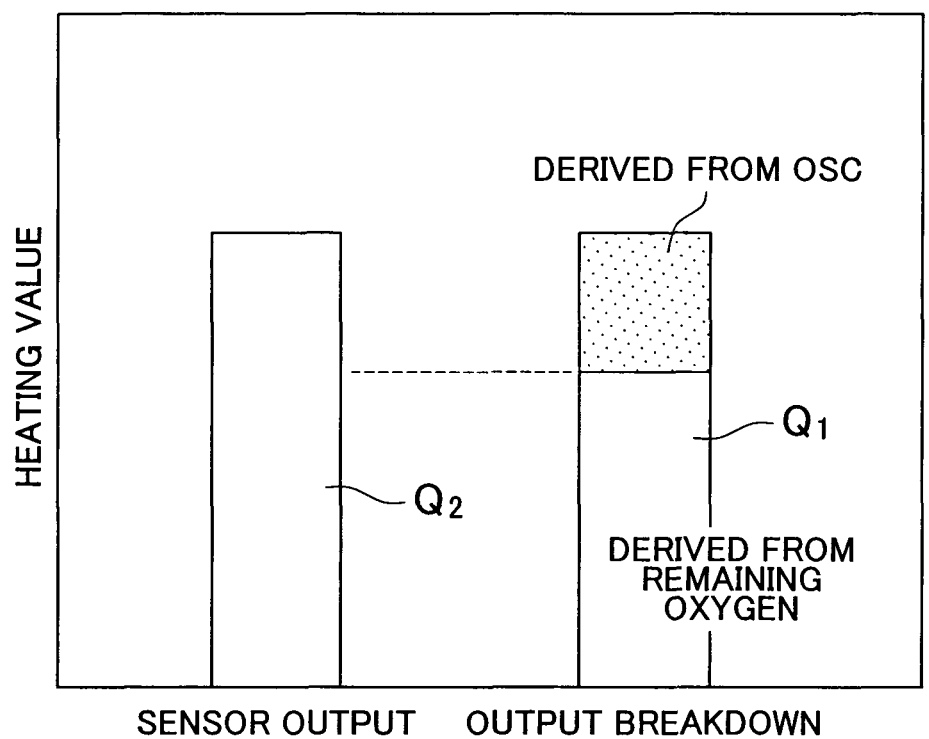
FIG. 7 is a chart that indicates a principle of outputs of the temperature sensor according to the embodiments of the present invention when a catalyst (or an adsorbent) is adopted in which oxygen or NOx is stored under a lean air-fuel ratio and from which oxygen or NOx is released under a rich air-fuel ratio.

As described above, the catalyst (or the adsorbent) 2 applied to the surface of the temperature detecting means 1, may be a catalyst (or an adsorbent) that stores oxygen or NOx under a learn air-fuel ratio atmosphere and releases oxygen or NOx under a rich air-fuel ratio atmosphere. However, in this case, oxygen remains in the exhaust gas in a rich air-fuel ratio operating condition, and consequently, the exothermic reaction of the reactant is initiated on the temperature detecting means 1 with the remaining oxygen. Accordingly, the temperature detected by the temperature sensor 10 includes the amount of heat generated through the combustion of the remaining oxygen and the amount of heat generated through the release of oxygen or NOx from the catalyst (or the adsorbent) 2. Therefore, there is a possible reduction in the accuracy to determine whether the sulfur component is contained in the exhaust gas. The above relationship is shown in FIG. 7.

To solve the above problem, oxygen consumption means (not shown) is disposed upstream of the sulfur component detector (temperature sensor 10) to consume any remaining oxygen in the exhaust gas in the rich air-fuel ratio operating condition, when the internal combustion engine operates at the rich air-fuel ratio. Accordingly, the temperature t detected by the temperature sensor 10 only indicates the amount of heat generated by oxygen or NOx that is released from the catalyst (or the adsorbent) 2. Therefore, it is possible to improve the accuracy in detecting the sulfur component of the exhaust gas flowing into the exhaust gas purification system.

Such oxygen consumption means can be a carrier such as alumina, zirconia, ceria, and titania, or a carrier that is a complex composed of at least two of alumina, zirconia, ceria, and titania, which supports an active species with an oxidative activity such as platinum, palladium, rhodium, gold, silver, and iron.

Figure 8:
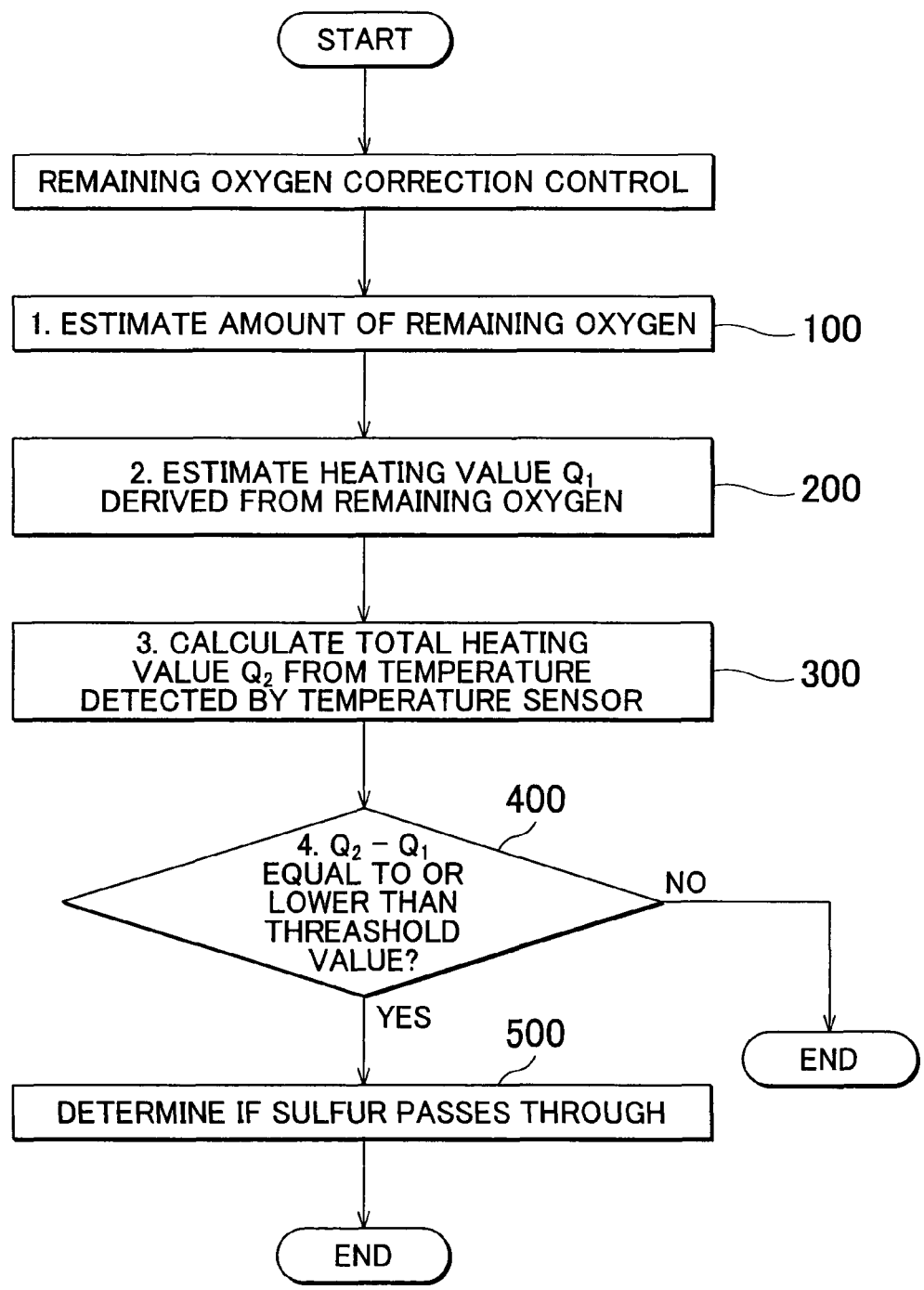
FIG. 8 is a flowchart that describes determination of passing sulfur made by the sulfur component detector in consideration of remaining oxygen, the sulfur component detector utilizing the temperature sensor according to the embodiments of the present invention.

The amount of heat generated by combusting the remaining oxygen in the exhaust gas in the rich air-fuel ratio operating condition may also be calculated. The sulfur component detector includes a control unit that determines whether the sulfur component is present in the exhaust gas flowing into the exhaust purification system based on the detected temperature. The control unit includes an operation map that shows the relationship between an operating condition of the internal combustion engine and the remaining amount of oxygen in the exhaust gas. The control unit calculates the remaining amount of oxygen in the exhaust gas using the operation map in step 100 shown in FIG. 8, and calculates (estimates) a heating value $Q_1$ based on the calculated remaining amount of oxygen in the step 200. Then, a total heating value $Q_2$ is calculated from the detected temperature sensor in step 300. In step 400, $Q_1$ is subtracted from $Q_2$. If the result is equal to or below a certain value, it is determined in step 500 that the sulfur component passes through. Instead of the heating values, a change in temperature may be utilized to determine whether the sulfur component passes through. In this case, the remaining amount of oxygen in the exhaust gas in the rich air-fuel ratio operating condition is estimated from the operating condition (operation map). A temperature increase $dT_{OX}$ that is indicated by the temperature sensor 10 is estimated based on the remaining amount of oxygen. Then, a temperature $T_1'$ is obtained by subtracting the temperature increase $dT_{OX}$ from the temperature $T_1$ that is detected by the temperature sensor 10. If the temperature $T_1'$ is below the temperature $T_0$, it is determined that the sulfur component passes through.

Figure 9:
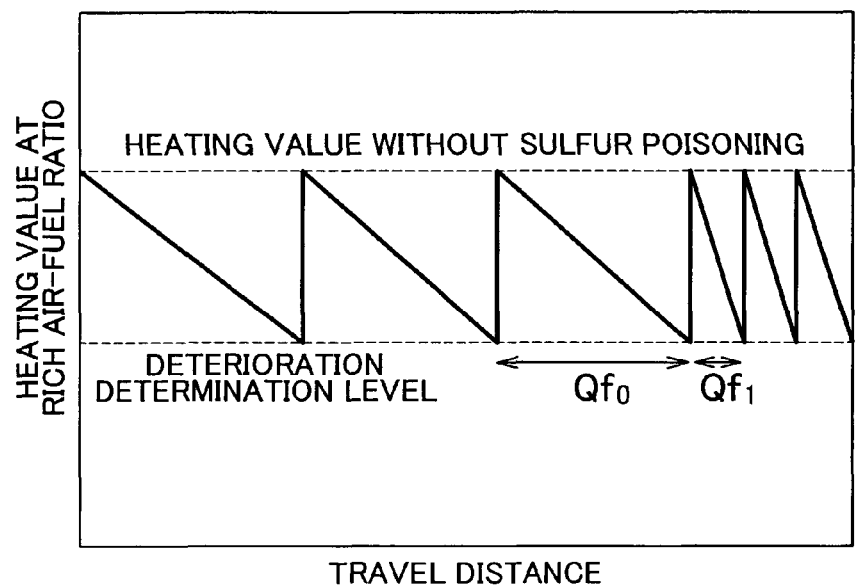
FIG. 9 is a view that depicts the schematic configuration of the temperature sensor according to the embodiments of the present invention that is adopted for exhaust gas in the internal combustion engine.

In another embodiment of the present invention, for example, the temperature sensor 10 is disposed upstream in the exhaust pipe of the internal combustion engine, and determines high sulfur concentration when concentration of sulfur in fuel is high. First, the temperature difference $dT_1$ between the temperature $T_0$ that is indicated by the temperature sensor 10 before the catalyst (or the adsorbent) 2, which is applied to the surface of the temperature detecting means 1 in the temperature sensor 10, is subjected to sulfur poisoning, and the detected temperature $T_1$ are calculated. If the temperature $T_1$ is decreased by sulfur poisoning and the temperature difference $dT_1$ becomes equal to or larger than a specified value, a purge treatment is performed on the sulfur component adsorbed by the catalyst (or the adsorbent) 2, which is applied to the surface of the temperature detecting means 1. Next, when the purge treatment is frequently performed due to increased sulfur poisoning, it is determined that the concentration of sulfur in the fuel is high. The purge treatment of the sulfur component may be performed by heating the catalyst (or the adsorbent) 2 to a high temperature. At this time, it is preferable that the catalyst (or the adsorbent) 2 is heated to a high temperature in a rich air-fuel ratio atmosphere. In this case, the time interval between the purge treatments is reduced in comparison with a specified time interval. Thus, it is determined that the fuel used contains a high concentration of the sulfur component. Meanwhile, instead of utilizing the time interval for determination, as shown in FIG. 9, it is determined that the concentration of sulfur component in the fuel used is high when the decrease in a fuel consumption amount $Qf_1$ consumed per cycle of the purge treatment falls below a specified fuel consumption amount $Qf_0$.

Figure 10:
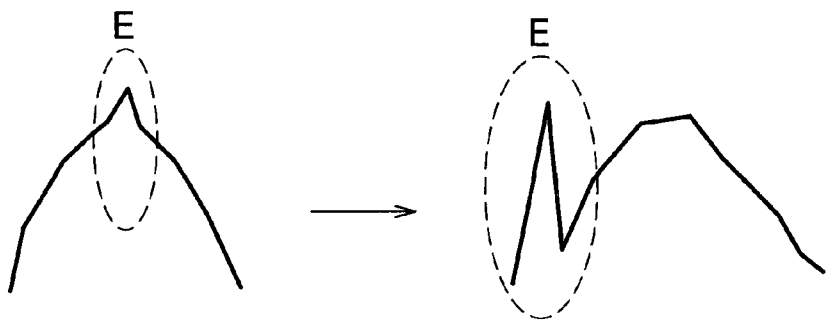
FIG. 10 is a view that describes outputs in other forms of the temperature sensor when the temperature sensor according to the embodiments of the present invention is adopted.

If a member that having a predetermined heat capacity is disposed upstream of the temperature sensor 10 when the sulfur component detector according to the embodiments of the present invention is applied for the exhaust gas in the internal combustion engine, as shown in FIG. 6, it is possible to separate the peak of the temperature by the exothermic reaction on the catalyst (or the adsorbent) 2 from the peak of the exhaust temperature by combustion in the internal combustion engine. This is advantageous for detecting the peak of the temperature by the exothermic reaction. In other words, if a member with the large heat capacity, such as the sulfur trap device, is not provided upstream of the temperature sensor 10, the peak of the temperature by the exothermic reaction on the catalyst (or the adsorbent) 2 and the peak of the exhaust temperature by the combustion in the internal combustion engine overlap in the temperature that is detected by the temperature sensor 10, as shown in FIG. 10 (a left figure). Thus, it is difficult to determine, the temperature peak E of the exothermic reaction on the catalyst (or the adsorbent) 2. However, if the member having the specified heat capacity is disposed upstream of the temperature sensor 10, the two temperature peaks may be separated, as shown in FIG. 10 (a right figure). Thus, it is easy to determine the temperature peak E by the exothermic reaction on the catalyst (or the adsorbent) 2. Therefore, even in an embodiment in which the sulfur trap device is not disposed upstream of the temperature sensor 10, the member having the specified heat capacity is preferably disposed upstream of the temperature sensor 10.

Figure 11:
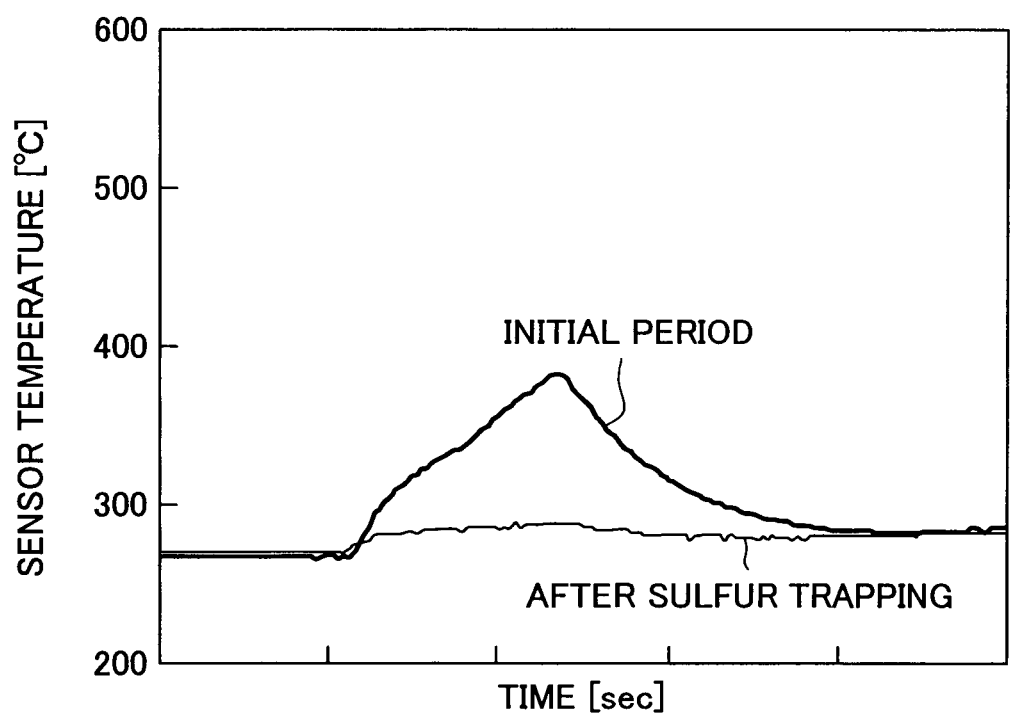
FIG. 11 is a graph that shows changes in the temperature of the sulfur component detector when the most appropriate material is selected for the temperature sensor according to the embodiments of the present invention.

If the embodiment of the present invention further adopts both an active species with activity that is significantly decreased by sulfur poisoning as the catalyst and a basic carrier that is also susceptible to sulfur poisoning while eliminating a material with an oxygen storage capacity (OSC) such as ceria and praseodymium in order to detect the temperature only during NOx reduction, it is possible to significantly increase the sensitivity of the temperature sensor 10. For example, when a carrier, such as alumina and zirconia, that is supported by alkali metal or alkali-earth metal and that also carries palladium is employed, the sensitivity of the sensor may significantly be improved. FIG. 11 shows an example of the behavior of a temperature sensor 10 with increased sensitivity, as described above, during a rich spike. Compared to the FIG. 6, FIG. 11 shows that the temperature increase in an initial period is large while the temperature increase after sulfur poisoning is small. Accordingly, a large difference between the temperatures indicates that the sensitivity is significantly improved.

Figure 12:
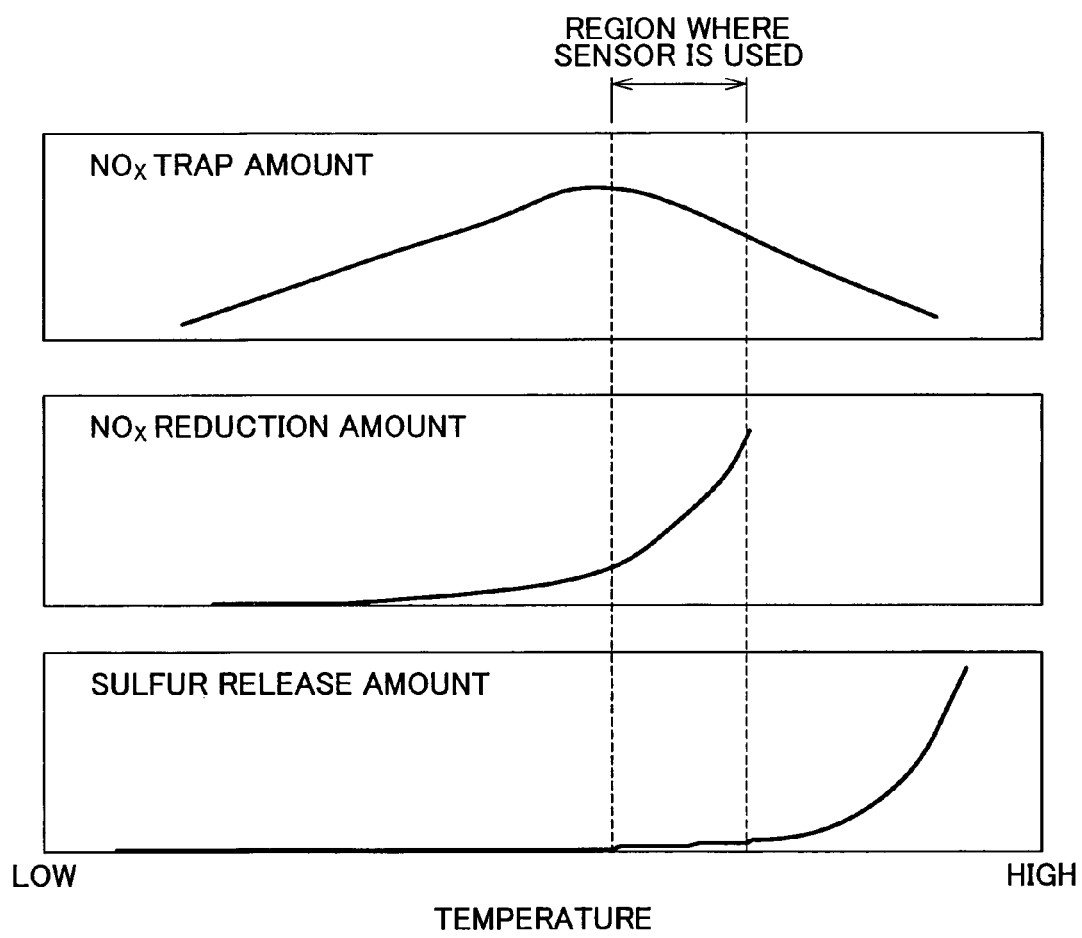
FIG. 12 is a graph that describes a reason for improved sensitivity of the temperature sensor according to the embodiments of the present invention when the most appropriate material is selected for the temperature sensor.

FIG. 12 shows the significant improvement in sensitivity as described above. The temperature sensor 10, whose sensitivity is improved by combination of the above materials, may be utilized in a region with a high NOx reduction and a low sulfur release. Accordingly, the temperature increase by NOx reduction is large while the temperature increase after sulfur poisoning is small due to high susceptibility to sulfur poisoning. Because the difference between the temperatures is large, the sensitivity may significantly be improved.

Figure 13:
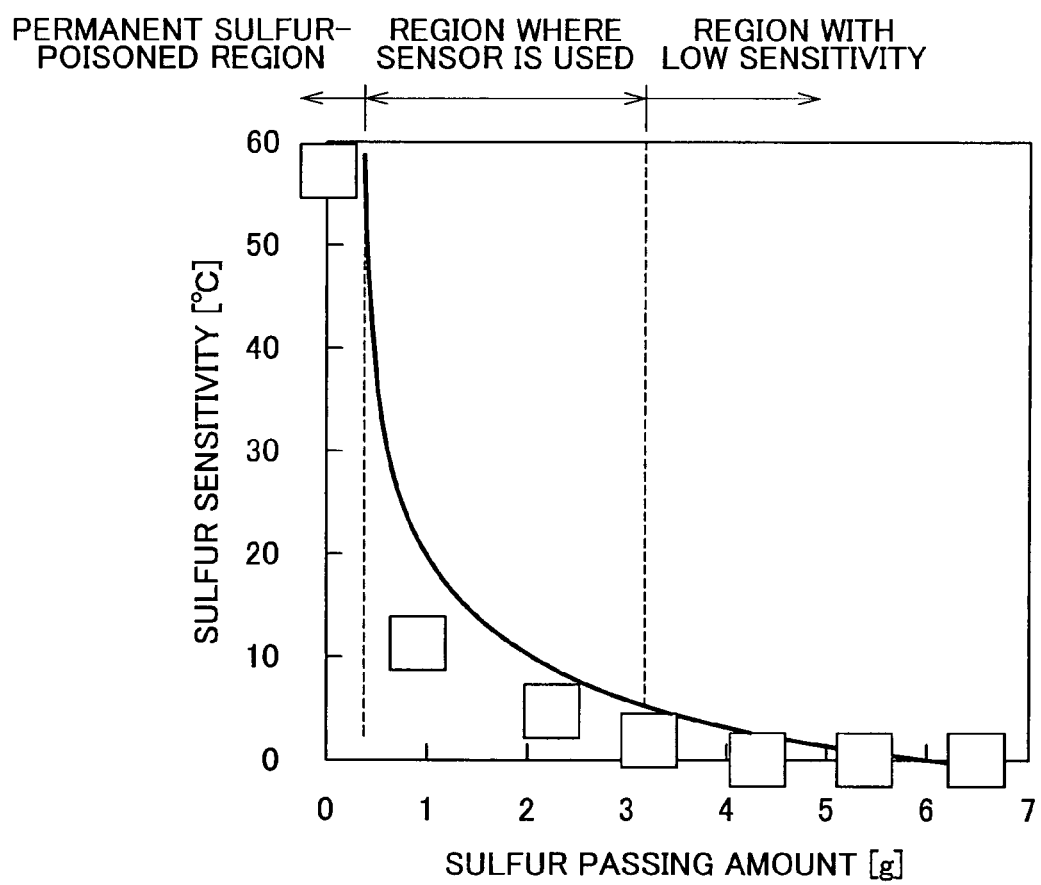
FIG. 13 is a graph that depicts the region where the temperature sensor according to the embodiments of the present invention is utilized.

The sensitivity of the temperature sensor 10 decreases as the amount of the sulfur component that passing through increases. Once the degree of sulfur poisoning that the temperature sensor 10 is subjected to reaches a prescribed degree, the purge treatment is performed on the sulfur component adsorbed by the catalyst (or the adsorbent) 2 applied to the surface of the temperature detecting means 1. However, there is a region in the temperature sensor 10 that cannot recover from sulfur poisoning through the purge treatment and is permanently poisoned by sulfur. FIG. 13 is a graph that indicates such properties of the temperature sensor 10. As shown in FIG. 13, a permanent sulfur-poisoned region is present in the temperature sensor 10. Therefore, when the temperature sensor 10 is installed and utilized in a real machine, it is further preferable that the temperature sensor 10 undergoes a pretreatment before being installed in the real machine. During pretreatment, the temperature sensor 10 is subjected to sulfur poisoning, and then the purge treatment is performed on the sulfur component that is adsorbed by the catalyst (or the adsorbent) 2.

Figure 14:
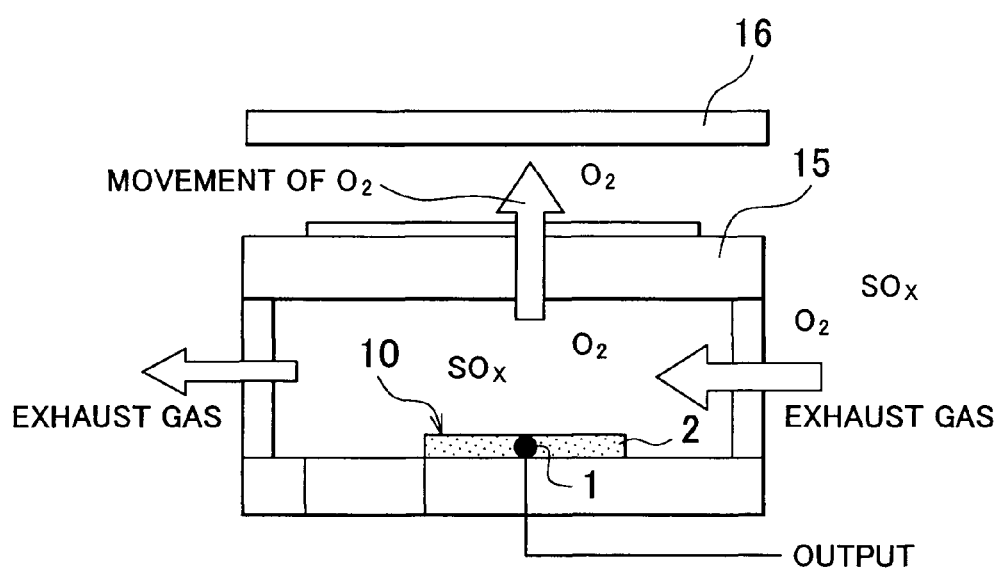
FIG. 14 describes efficient utilization of the temperature sensor according to the embodiments of the present invention.

When the purge treatment is performed in the temperature sensor 10 that is being utilized in the real machine, it is required to obtain the rich air-fuel ratio and to heat the exhaust gas to a high temperature by injecting the fuel into the exhaust gas and combusting oxygen in the exhaust gas. However, a large amount of the fuel is required to make a total amount of the exhaust amount at the rich air-fuel ratio and the high temperature. Therefore, in another embodiment of the present invention, as shown in FIG. 14, the temperature sensor 10 further includes a pump cell 15 with an oxygen pumping function, and a heater 16. In the above configuration, when a direct voltage (not shown) is applied to the pump cell 15, the pump cell 15 removes oxygen in the exhaust gas flowing near the temperature sensor 10. Consequently, the atmosphere near the temperature sensor 10 becomes the rich air-fuel ratio atmosphere. Thus, the purge treatment of the temperature sensor 10 may easily be performed by heating the temperature sensor 10 with the heater 16. Therefore, there it is unnecessary to inject fuel into the exhaust gas or to make the total amount of the exhaust gas at the rich air-fuel ratio and the high temperature. The purge treatment may be performed very economically.

In another embodiment, the sulfur trap catalyst 20 as shown in FIG. 1 is not provided while catalytic regeneration means of the NOx storage-reduction catalyst 30 is provided. In this embodiment, the temperature sensor 10 is disposed upstream of the NOx storage-reduction catalyst 30 to estimate the degree of sulfur poisoning that the NOx storage-reduction catalyst 30 is subjected to. More specifically, the temperature sensor 10 detects the amount of the sulfur content that passes through at a predetermined interval, such as predetermined time intervals, of after a certain amount of fuel is consumed, and then to accumulate the amounts of the sulfur component in order to calculate the amount of the sulfur content that has passed through the NOx storage-reduction catalyst 30. Accordingly, the temperature sensor 10 may detect the degree of sulfur poisoning that the NOx storage-reduction catalyst 30 is subjected to.

Figure 15:
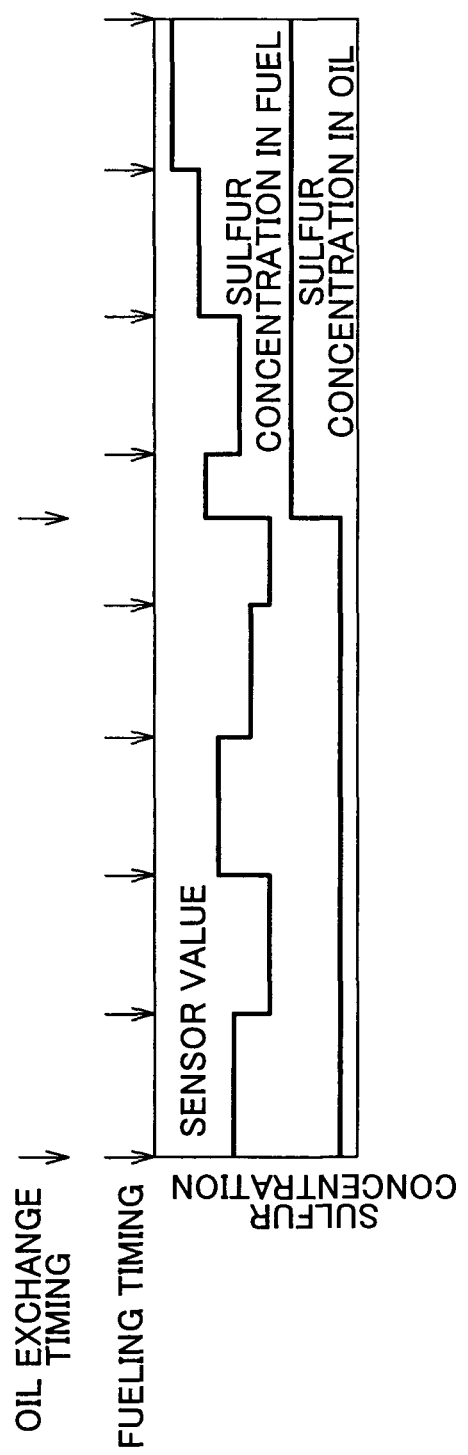
FIG. 15 is a chart that depicts the schematic configuration of the temperature sensor according to the embodiments of the present invention is applied for the exhaust gas in the internal combustion engine.

FIG. 15 shows another embodiment that differs from the embodiment shown in FIG. 9 and in which the temperature sensor 10 detects the sulfur concentration in fuel or engine oil. In FIG. 15, for example, the temperature sensor 10 is disposed upstream of the exhaust pipe of the internal combustion engine, and detects the amount of the sulfur component that passes through in the exhaust gas per fueling cycle or per replacement cycle of the engine oil. As shown in FIG. 15, the fueling cycle and the replacement cycle of the engine oil differ from each other. Thus, by recording changes in the amount of the sulfur component that passes through per fueling cycle and per replacement cycle of the engine oil, it is possible to determine whether the sulfur component in the exhaust gas is attributed to the fuel or the engine oil. In addition, it is possible to accurately calculate the sulfur concentration in the fuel by utilizing the sulfur amount in the exhaust gas that is obtained in the last fueling cycle and the sulfur amount in the exhaust gas that is obtained in the current fueling cycle. It is also possible to accurately calculate the sulfur concentration in the engine oil by utilizing the sulfur amount in the exhaust gas that is obtained in the last cycle of engine oil replacement and the sulfur amount in the exhaust gas that is obtained in the current cycle of the engine oil replacement.

In further another embodiment, in a system equipped with a diesel particulate filter (DPF), the temperature sensor 10 is disposed upstream of the DPF. If fuel or engine oil with the high sulfur content is utilized, the temperature sensor 10 monitors the amount of the sulfur component trapped in the DPF to prevent generation of sulfate fumes from the DPF. The temperature sensor also controls the DPF such that the DPF is regenerated before the amount of trapped sulfur in the DPF exceeds a prescribed amount.

Figure 16:
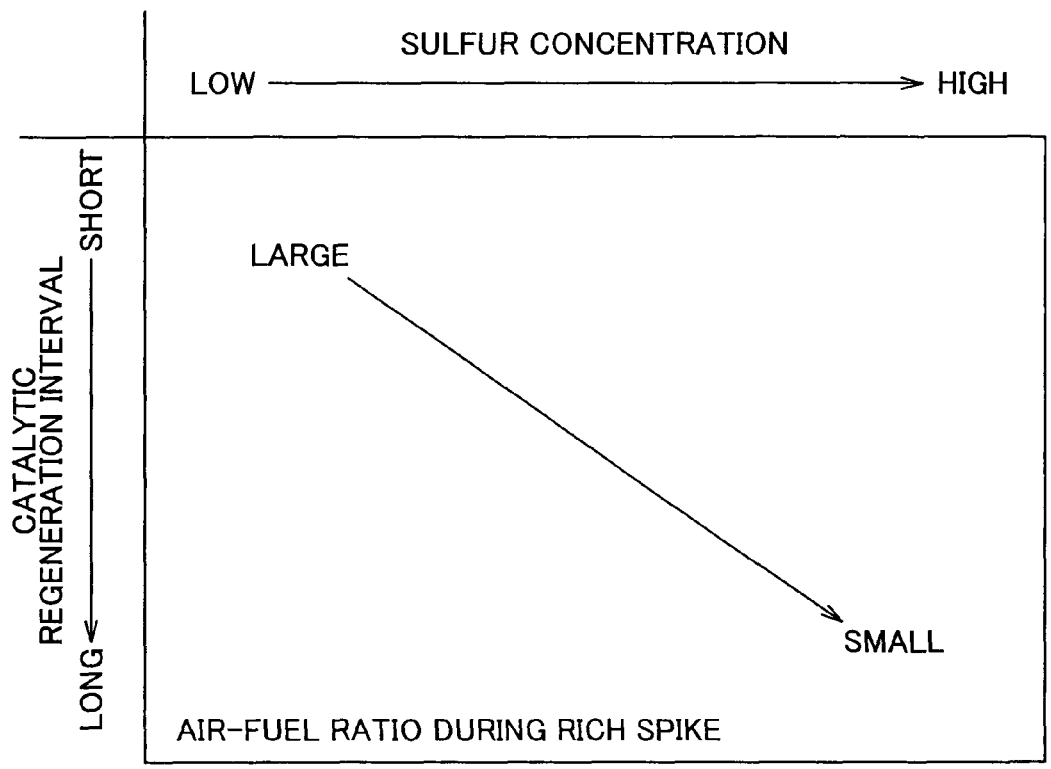
FIG. 16 is a chart that depicts the schematic configuration of the temperature sensor according to the embodiments of the present invention is applied for the exhaust gas in the internal combustion engine.

In a system equipped with the NOx storage-reduction catalyst, it is possible to optimize a regeneration operation interval of the NOx storage-reduction catalyst in accordance with the sulfur concentration in the fuel and the engine oil. More specifically, a relationship among the sulfur concentration in the fuel and the engine oil, the air-fuel ratio of the rich spike during the regeneration operation of the NOx storage-reduction catalyst, and an interval of a catalytic regeneration operation is shown in FIG. 16. The relationship is embedded as an operation map of a control system for the catalytic regeneration operation. Accordingly, it is possible to perform the catalyst regeneration operation at an optimum operation interval.

Figure 17:
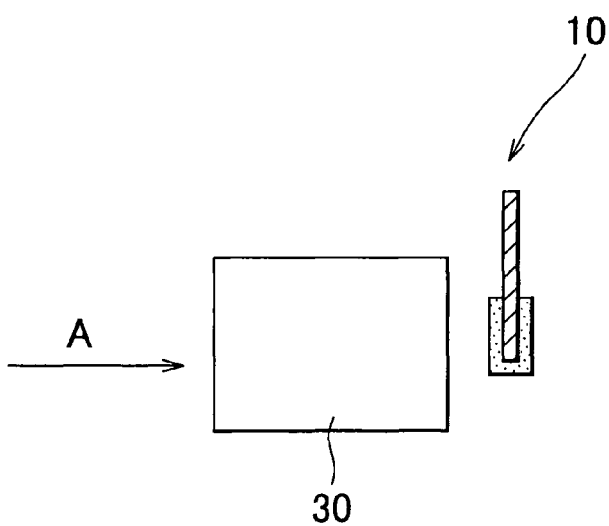
FIG. 17 is a view that depicts the schematic configuration of the temperature sensor according to the embodiments of the present invention is applied for the exhaust gas in the internal combustion engine.

In further another embodiment, as shown in FIG. 17, the temperature sensor 10 is disposed downstream of the NOx storage-reduction catalyst so that it is possible to measure the amount of sulfur released by the NOx storage-reduction catalyst during the catalyst regeneration operation. In this case, when the NOx storage-reduction catalyst is under a rich air-fuel ratio atmosphere during the catalyst regeneration operation, the catalyst (or the adsorbent) 2 of the temperature sensor 10 is also in a regeneration atmosphere. Accordingly, the amount of sulfur trapped in the temperature sensor 10 decreases in comparison with that during normal operation. Therefore, in the arrangement in FIG. 17, when amount of sulfur released by the NOx storage-reduction catalyst is measured during the catalyst regeneration operation, it is required to correct the sensitivity of the temperature sensor 10. In this case, the sensitivity of the temperature sensor 10 in the rich air-fuel ratio atmosphere is obtained in advance to create a sensitivity map and the like. Then, the sensitivity map is included in a temperature detection system of the temperature sensor 10, for example, and utilized to correct the sensitivity of the temperature sensor 10.

Also, in this case, the temperature sensor 10 includes the above-described oxygen pumping function. The oxygen pumping function acts in an opposite direction by reversing the polarity of voltage applied to the pump cell 15 to send oxygen toward the temperature sensor 10. Thus, oxygen is released near the temperature sensor 10. Therefore, it is possible to measure the sulfur release amount of the NOx storage-reduction catalyst during the catalyst regeneration operation by maintaining only the atmosphere near the temperature sensor 10 in the rich air-fuel ratio atmosphere to prevent deterioration in the sensitivity of the temperature sensor 10.

Figure 18:
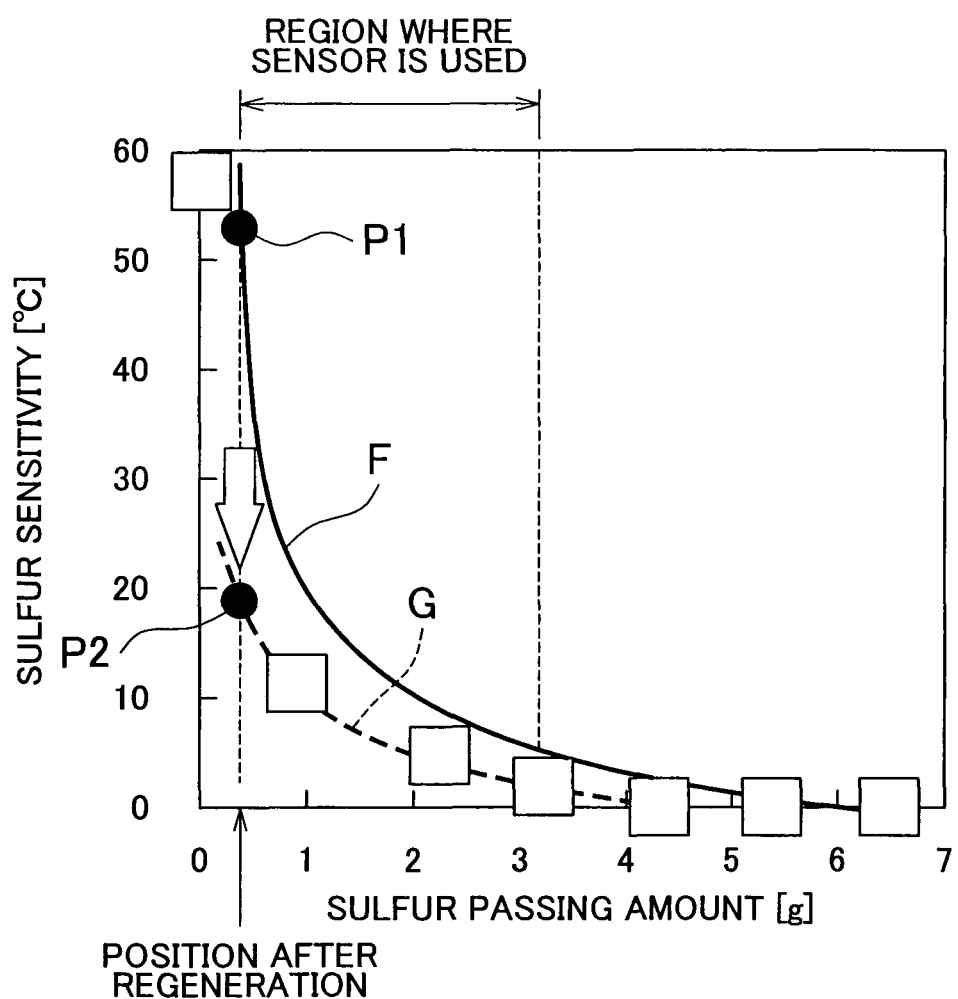
FIG. 18 is a chart that depicts the schematic configuration of the temperature sensor according to the embodiments of the present invention is applied for the exhaust gas in the internal combustion engine.

Deterioration of temperature sensor 10 occurs not only through sulfur poisoning. If the temperature sensor 10 continues to be used, the initial sensitivity will not be recovered even if the sulfur component adsorbed by the catalyst (or the adsorbent) 2, which is applied to the surface of the temperature detecting means 1, is periodically purged. More specifically, as shown in FIG. 18, a sensitivity curve in the initial use period of the temperature sensor 10 is expressed as a curve F. The sensitivity recovers to P1 after the sulfur component has been purged. However, if the temperature sensor 10 is continues to be used, the sensitivity curve moves toward a curve G even the sulfur component is regularly purged. The sensitivity eventually recovers only to P2, even after the sulfur component has been purged. Therefore, once the sensitivity of the temperature sensor 10 after the purge treatment is decreased to a threshold value, it is determined that the temperature sensor 10 is deteriorated, and it is preferably to replace the temperature sensor 10 with a new temperature sensor.

In this case, if the sensitivity of the deteriorated temperature sensor 10 is determined after the purge treatment, it is possible to estimate the decreased sensitivity in the entire sensitivity curve. Therefore, in another embodiment, a map that indicates deterioration in sensitivity of the temperature sensor 10 is provided in advance. Thus, it is preferable to correct the sensitivity in the entire sensitivity curve by obtaining the sensitivity of the temperature sensor 10 after the purge treatment.

While the invention has been described with reference to example embodiments thereof, it should be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A sulfur component detector comprising:
   a temperature sensor disposed in a flow passage of gas and having at least one of a catalyst and an adsorbent, the temperature sensor being configured to detect a temperature of the gas, the temperature sensor having a surface to which the at least one of the catalyst and the adsorbent is applied, wherein the at least one of the catalyst and the adsorbent is configured to catalyze an exothermic reaction of a reactant that is contained in the gas, and the at least one of the catalyst and the adsorbent is a catalyst or an adsorbent whose catalytic efficiency for the exothermic reaction of the reactant in the gas is degraded by sulfur poisoning; and a control unit configured to determine whether a sulfur component is present in the gas, the control unit determining that the sulfur component is present in response to the temperature sensor detecting a temperature $T_1$ of the gas increased by the exothermic reaction which is less than a temperature $T_0$ of the gas increased by the exothermic reaction when the sulfur component is not present in the gas.

2. The sulfur component detector according to claim 1, wherein the at least one of the catalyst and the adsorbent that is applied to the surface of the temperature sensor is a carrier in which alumina or zirconia is supported by alkali metal or alkaline-earth metal and which also carries palladium.

3. The sulfur component detector according to claim 1, wherein:

the gas is exhaust gas from an internal combustion engine;

the at least one of the catalyst and the adsorbent that is applied to the surface of the temperature sensor stores oxygen or nitrogen oxide in the exhaust gas when the internal combustion engine operates at a lean air-fuel ratio, and releases oxygen or nitrogen oxide into the exhaust gas when the internal combustion engine operates at a rich air-fuel ratio;

the at least one of the catalyst and the adsorbent utilizes the released oxygen or nitrogen oxide to catalyze the exothermic reaction of the reactant in the exhaust gas on the temperature sensor, and the temperature sensor detects the temperature that is increased by the exothermic reaction; and an oxygen or nitrogen oxide storage capacity and the catalytic efficiency for the exothermic reaction of the at least one of the catalyst and the adsorbent is reduced by sulfur poisoning.

4. The sulfur component detector according to claim 1, further comprising:

a pump cell that has an oxygen pumping function; and a heater.

5. The sulfur component detector according to claim 1, wherein the temperature sensor is disposed downstream of a $NO_x$ storage-reduction catalyst and is configured to measure a sulfur release amount of the $NO_x$ storage-reduction catalyst during a catalytic regeneration operation for a rich air-fuel ratio.

6. The sulfur component detector according to claim 1, wherein:

the temperature sensor is disposed in an exhaust pipe of an internal combustion engine;

the sulfur component adsorbed by the at least one of the catalyst and the adsorbent that is applied to the temperature sensor is treated with a purge treatment if a temperature difference $dT_1$ between the temperature $T_0$ and the temperature $T_1$ becomes equal to or larger than a specified value due to a decrease in the temperature $T_1$ that is indicated by the sulfur component detector; and it is determined that fuel in use contains a high concentration of the sulfur component if a fuel consumption amount after the adsorbed sulfur component has been purged and before the next purge treatment falls below a specified fuel consumption amount.

7. The sulfur component detector according to claim 1, wherein:

the temperature sensor is disposed in an exhaust pipe of an internal combustion engine;

the sulfur component adsorbed by the at least one of the catalyst and the adsorbent that is applied to the temperature sensor is treated with a purge treatment if a temperature difference $dT_1$ between the temperature $T_0$ and the temperature $T_1$ becomes equal to or larger than a specified value due to a decrease in the temperature $T_1$ that is indicated by the sulfur component detector; and it is determined that fuel in use contains a high concentration of the sulfur component if a time interval after the adsorbed sulfur component has been purged and before the next purge treatment falls below a specified time interval due to an increased degree of sulfur poisoning.

8. The sulfur component detector according to claim 1, further comprising:

a member that has a specified heat capacity, wherein:

the temperature sensor is disposed in an exhaust passage of the internal combustion engine;

the member that has the specified heat capacity is disposed upstream of the temperature sensor;

time at which an exhaust temperature increase by combustion in the internal combustion engine is detected by the temperature sensor is delayed; and the exhaust temperature increase by combustion in the internal combustion engine and a temperature increase by the exothermic reaction in the temperature sensor are separately detected.

9. The sulfur component detector according to claim 4, wherein:

the temperature sensor is disposed downstream of a $NO_x$ storage-reduction catalyst;

oxygen is released near the temperature sensor by the oxygen pumping function; and a sulfur release amount of the $NO_x$ storage-reduction catalyst during a catalytic regeneration operation is measured after the atmosphere near the temperature sensor becomes a lean air-fuel ratio atmosphere.

10. An exhaust purification system for an internal combustion engine, comprising:

a sulfur trap device configured to store a sulfur component present in exhaust gas; and the sulfur component detector according to claim 1, the sulfur component detector being provided downstream of the sulfur trap device and upstream of a $NO_x$ storage-reduction catalyst, wherein the control unit of the sulfur component detector determines that the sulfur component is present in the exhaust gas flowing into the exhaust purification system in response to performance of the sulfur trap device to store the sulfur component in the exhaust gas increasing.

11. An exhaust purification system for an internal combustion engine, comprising:

a sulfur trap device configured to store a sulfur component present in exhaust gas;

the sulfur component detector according to claim 3, the temperature sensor being disposed downstream of the sulfur trap device and upstream of a $NO_x$ storage-reduction catalyst; and an oxygen consumption device disposed upstream of the temperature sensor, wherein the oxygen consumption device is configured to consume oxygen remaining in the exhaust gas when the internal combustion engine operates at a rich air-fuel ratio.

12. An exhaust purification system for an internal combustion engine, comprising:

a sulfur trap device configured to store a sulfur component present in exhaust gas; and the sulfur component detector according to claim 3, the temperature sensor being disposed downstream of the sulfur trap device and upstream of a $NO_x$ storage-reduction catalyst, wherein:

if the internal combustion engine operates at a rich air-fuel ratio, a remaining amount of oxygen in the exhaust gas is estimated from an operating condition of the internal combustion engine;

a temperature increase $dT_{ox}$ that depends on the remaining amount of oxygen and is indicated by the sulfur component detector is estimated; and it is determined that the sulfur component is present in the exhaust gas flowing into the exhaust purification system if a temperature $T_1'$ that is obtained by subtracting the temperature increase $dT_{ox}$ from the temperature $T_1$ that is indicated by the sulfur component detector is below the temperature $T_0$.

13. An exhaust purification system for an internal combustion engine, comprising:

a sulfur trap device configured to store a sulfur component present in exhaust gas; and the sulfur component detector according to claim 3, the temperature sensor being disposed downstream of the sulfur trap device and upstream of a $NO_x$ storage-reduction catalyst, wherein:

if the internal combustion engine operates at a rich air-fuel ratio, a remaining amount of oxygen in the exhaust gas is estimated from an operating condition of the internal combustion engine;

a heating value $Q_1$ that depends on the remaining amount of oxygen is estimated;

a total heating value $Q_2$ is calculated from a detected value by the sulfur component detector;

the heating value $Q_1$ is subtracted from the heating value $Q_2$; and it is determined that the sulfur component is present in the exhaust gas flowing into the exhaust purification system if the resulting difference between $Q_1$ and $Q_2$ is equal to or below a prescribed value.

* * * * *